United States Patent
Keller et al.

(10) Patent No.: US 6,170,367 B1
(45) Date of Patent: Jan. 9, 2001

(54) SINGLE-POINT FLEXURE TORIC CONTACT LENS FORMING MACHINE AND METHOD

(76) Inventors: John R. Keller, 1403 Portesuello Ave., Santa Barbara, CA (US) 93105; Richard L. Cooksey, 2168 Dunnigan St., Camarillo, CA (US) 93010

(*) Notice: Under 35 U.S.C. 154(b), the term of this patent shall be extended for 0 days.

(21) Appl. No.: 09/150,052

(22) Filed: Sep. 9, 1998

(51) Int. Cl.[7] ............................... B23B 5/00
(52) U.S. Cl. .................. 82/1.11; 82/123; 83/13
(58) Field of Search .............. 82/1.11, 123, 158; 83/13

(56) References Cited

U.S. PATENT DOCUMENTS

| | | | |
|---|---|---|---|
| 4,203,062 | * | 5/1980 | Bathen .................. 318/571 |
| 4,680,998 | * | 7/1987 | Council, Jr. .............. 82/12 X |
| 4,908,997 | | 3/1990 | Field, Jr. et al. ............ 51/284 |
| 5,152,202 | * | 10/1992 | Strauss ................... 82/123 X |
| 5,195,407 | * | 3/1993 | Takeno et al. ............. 82/1.11 |
| 5,330,203 | * | 7/1994 | Fleenor et al. ........... 279/46.3 |
| 5,570,142 | * | 10/1996 | Lieberman ............. 351/160 R |
| 5,718,154 | * | 2/1998 | Council, Jr. .............. 82/1.11 |
| 5,938,381 | * | 8/1999 | Diel et al. ................ 409/132 |

OTHER PUBLICATIONS

Xu et al., "Flexure hinges for piezoactuator displacement amplifiers: flexibility, accuracy, and stress considerations", *Precision Engineering*, vol. 19, 1996, pp. 4–10.

James F. Cuttino, Thomas A. Dow, "Compensation For Nonliner Effects in Piezoelectric Actuators", Precision Engineering Center, North Carolina State University, pp. 134–137.

* cited by examiner

*Primary Examiner*—Rinaldi I. Rada
*Assistant Examiner*—T. Anthony Vaughn

(57) ABSTRACT

In a fast tool servo, a single-point flexure mechanism amplifies a low force, large stroke range actuator's force while reducing its stroke range to reduce the arcuate motion of the cutting tool. The flexure mechanism bends around a pivot point in the X-Z plane and is very stiff along the Y-axis. The actuator applies force to the unpinned end of a lever arm causing it to move back-and-forth through a large stroke range. In response, the shorter tool arm rocks around the pivot point causing the tool to oscillate back-and-forth along the Z-axis through a very shallow arc thereby superimposing the toric deviation on the base curve while maintaining surface quality.

13 Claims, 2 Drawing Sheets

SINGLE-POINT FLEXURE TORIC CONTACT LENS FORMING MACHINE AND METHOD

BACKGROUND OF THE INVENTION

1. Field of the Invention

This invention relates to forming toric contact lenses and more specifically to a lens forming machine and method that use a single-point flexure mechanism in combination with a low force, large stroke range actuator to provide the high speed cutting tool motion necessary to form a toric curve.

2. Description of the Related Art

A toric surface is characterized by a pair of orthogonal curvatures with different radii, and is typically formed by superimposing a toric deviation upon a spherical base curve. One type of contact lens forming machine, known as a "fast tool servo," includes a spindle that holds a lens blank in the X-Y plane and rotates it around its spindle axis. The spindle is mounted on a Z-axis slide that moves along the spindle axis. A single-point cutting tool is mounted on an X-axis slide that moves perpendicular to the lens blank.

To form the contact lens' base curve, the rotating lens blank is moved in the Z direction against the cutting tool. The tool is first moved progressively outward in the X direction away from the blank as the spindle moves in the Z direction until the tool reaches the middle of the blank, and is then moved progressively back inward towards the lens blank to complete the base curvature as the spindle and blank continue to pass in the Z direction. The force of the rotating lens tends to push the tool back and off-axis thereby distorting the surface. Therefore, it is very important that the cutting tool resists the motion of the lens blank and maintains its off-axis rigidity.

To superimpose a toric deviation on the base curve, the cutting tool is controlled by a piezoelectric crystal to make a series of small back-and-forth oscillations along the Z-axis during the formation of the lens's base curve. The oscillations are coordinated with the rotation of the lens blank so that the cutting tool makes one inward oscillation and one outward oscillation for every 180 degrees of lens blank rotation. This forms a pair of orthogonal toric lens curvatures with different radii.

The piezoelectric crystal produces the oscillations in response to a very high voltage that causes the crystal to shrink and expand. Because the piezoelectric crystal is very stiff, it produces a lot of force at the tip of the cutting tool so that the tool resists the motion/rotation of the lens blank. This same property restricts the motion of the crystal to approximately one one-thousandth of its length, which limits the stroke range of the cutting tool. Thus, to achieve the necessary stroke range the crystal must be very large. This is expensive and causes mounting problems. Furthermore, the very high voltages are dangerous and produce a lot of waste heat.

Wei Xu and Tim King, "Flexure hinges for piezoactuator displacement amplifiers: flexibility, accuracy, and stress considerations, " Precision Engineering 19, pp. 4–10, 1996 describe flexure hinges that sacrifice force in order to amplify the change in length of the piezoelectric crystal and increase the tool's stroke range. To maintain sufficient force to resist lens blank motion, the stroke range remains limited. Flexure hinge topologies typically combine three basic amplifying elements; simple lever, bridge, and four-bar linkage amplifiers.

As Xu states "The simple lever flexure-hinged displacement amplifier can produce large output displacements. Because the movement is arcuate, it may not, however be suitable for some high-precision applications requiring linear motion." Because the flexure hinge amplifies stroke range, any arcuate movement would be amplified at the tip of the cutting tool and introduce significant distortion into the lens. As a result, compound amplifiers are used to provide linear motion, but the compound amplifiers are expensive, complicated and sacrifice off-axis rigidity.

SUMMARY OF THE INVENTION

In view of the above problems, the present invention provides a simple lens forming machine with an expanded stroke range for forming the toric deviation and enhanced off-axis rigidity.

This is accomplished by replacing the conventional piezoelectric actuator and its compound flexure-hinge in a fast tool servo with a low force, large stroke range actuator and a single-point flexure mechanism that amplifies its force at the cutting tool tip and reduces its stroke range to reduce the arcuate motion of the tool. The mechanism includes a single-point flexure hinge that bends around a pivot point in the X-Z plane and is very stiff along its X and Y-axes, a lever arm that extends from the hinge, and a shorter tool arm that extends from the lever arm and holds the cutting tool perpendicular to the rotating lens blank. The flexure hinge amplifies the force by the ratio of the lever arm length to the tool arm length and reduces the stroke range, and hence the arcuate motion of the tool by the same ratio.

The actuator applies a force to the unpinned end of the lever arm causing it to move back-and-forth. In response, the tool arm rocks around the pivot point causing the tool to oscillate back-and-forth along the Z-axis through a very shallow arc thereby superimposing the toric deviation on the base curve. Mounting the cutting tool so that it's tip lies on an axis through the pivot point and parallel to the lens blank minimizes the side-to-side motion of the cutting tool and maximizes the stroke range. This approach provides a large finely resolved stroke range, Y-axis rigidity, and force amplification along the Z-axis to resist the force of the rotating lens pushing back on the tool.

These and other features and advantages of the invention will be apparent to those skilled in the art from the following detailed description of preferred embodiments, taken together with the accompanying drawings, in which:

DETAILED DESCRIPTION OF THE INVENTION

The present invention replaces the fast tool servo's piezoelectric actuator and compound flexure-hinge with a low force, large stroke range actuator and a single-point flexure mechanism that amplifies its force at the cutting tool tip and reduces its stroke range to reduce the arcuate motion of the tool. Even though reduced by the flexure-hinge, the stroke range of the cutting tool exceeds that of the amplified piezoelectric actuator. The single-point mechanism is very simple, very stiff along its off-axis, does not require the dangerously high voltages associated with the piezoelectric crystal, and does not generate a lot of heat.

Figure 1:
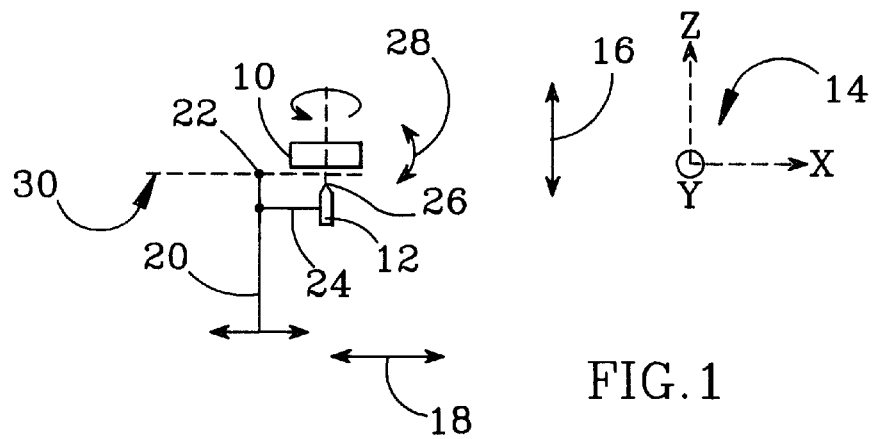
FIG. 1 is a schematic illustration of the single-point flexure mechanism used in lieu of the known piezoelectric crystal in the fast tool servo.

FIG. 1 illustrates the relative motion of a lens blank 10 and cutting tool 12 in an XYZ coordinate system 14 to superimpose a toric deviation on a base curvature. To form the lens' base curve, the lens blank and cutting tool are moved in the X and Z directions as the lens blank is rotated. As shown, the lens blank exhibits a gross motion along the Z-axis 16 while the cutting tool moves along the X-axis 18. Alternately, the lens blank could move along the X-axis with the cutting tool moving along the Z-axis without changing the relative motion.

To superimpose the desired toric deviation on the base curve, a lever arm 20 is pinned at a pivot point 22 that bends in the X-Z plane and is very stiff in the X and Y-axes and extends in the Z-direction from the pivot point. A tool arm 24 is attached to the lever arm and extends in the X direction where it holds cutting tool 12 perpendicular to lens blank 10. The unpinned end of the lever arm is moved back-and forth in the X direction so that the tool arm rocks around the pivot point causing the tip 26 of the cutting tool to oscillate back-and-forth through a very shallow arc 28 approximately perpendicular to the lens blank. The stroke range of tip 26 is the stroke range of the actuator reduced by the ratio of lever arm 20 to tool arm 24. This deamplification of the stroke range reduce the side-to-side motion of the tip and thus improves lens quality.

Mounting the cutting tool so that it's tip 26 lies on an axis 30 through pivot point 22 and parallel to lens blank 10 minimizes the side-to-side motion of the cutting tool and maximizes the stroke range for a given ratio. Alternately, the tool arm could extend from the lever arm at the pivot point. However, this would increase the side-to-side motion of the tip as it traverses the arc. Mounting the lever and tool arms so that they extend in the Z and X directions, respectively, from the pivot point simplifies the system geometry but is not necessary to get the desired oscillating motion of the cutting tool.

Figure 2:
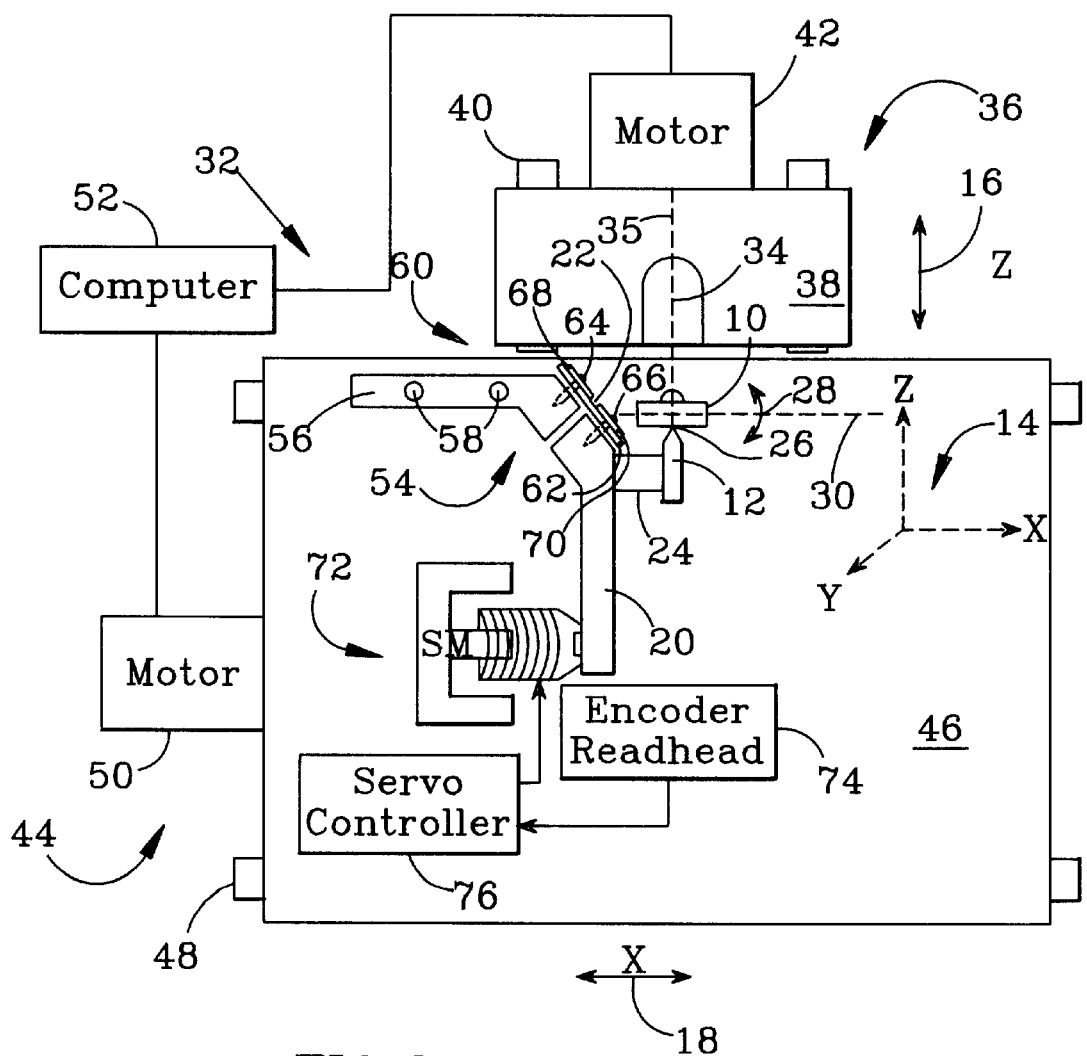
FIG. 2 is a schematic illustration of an embodiment of a single-point flexure fast tool servo in accordance with the present invention.

FIG. 2 illustrates one embodiment of a single-point flexure fast tool servo 32 for forming toric contact lenses. A spindle 34 holds lens blank 10 in the XY plane and rotates it around its spindle axis 35. Spindle 34 is mounted on a Z-axis slide 36 that comprises a table 38 slidably engaged on a pair of runners 40 and a linear motor 42 for moving table 38 back-and-forth in the Z direction 16. Cutting tool 12 is mounted on an X-axis slide 44 along the center line of lens blank 10. X-axis slide 44 also comprises a table 46 slidably engaged on a pair of runners 48 and a linear motor 50 for moving table 46 back-and-forth in the X direction 18. A technician inputs the desired curvature information into a computer 52, which coordinates the gross movement of the Z and X-axis slides and the rotational speed of the spindle in respective servo loops to form the base curve.

A single-point flexure mechanism 54 provides the high speed fine cutting tool motion necessary to superimpose a toric deviation on the base curve. Flexure mechanism 54 is a hinge formed by pinning one end of lever arm 20 to a stationary support 56 at pivot point 22. Screws 58 rigidly attach support 56 to x-axis slide 44 so that it lies along the x-axis adjacent the rotating lens blank. Lever arm 20 extends perpendicular to support 56 in the Z direction and is suspended over the x-axis slide.

Figure 3:
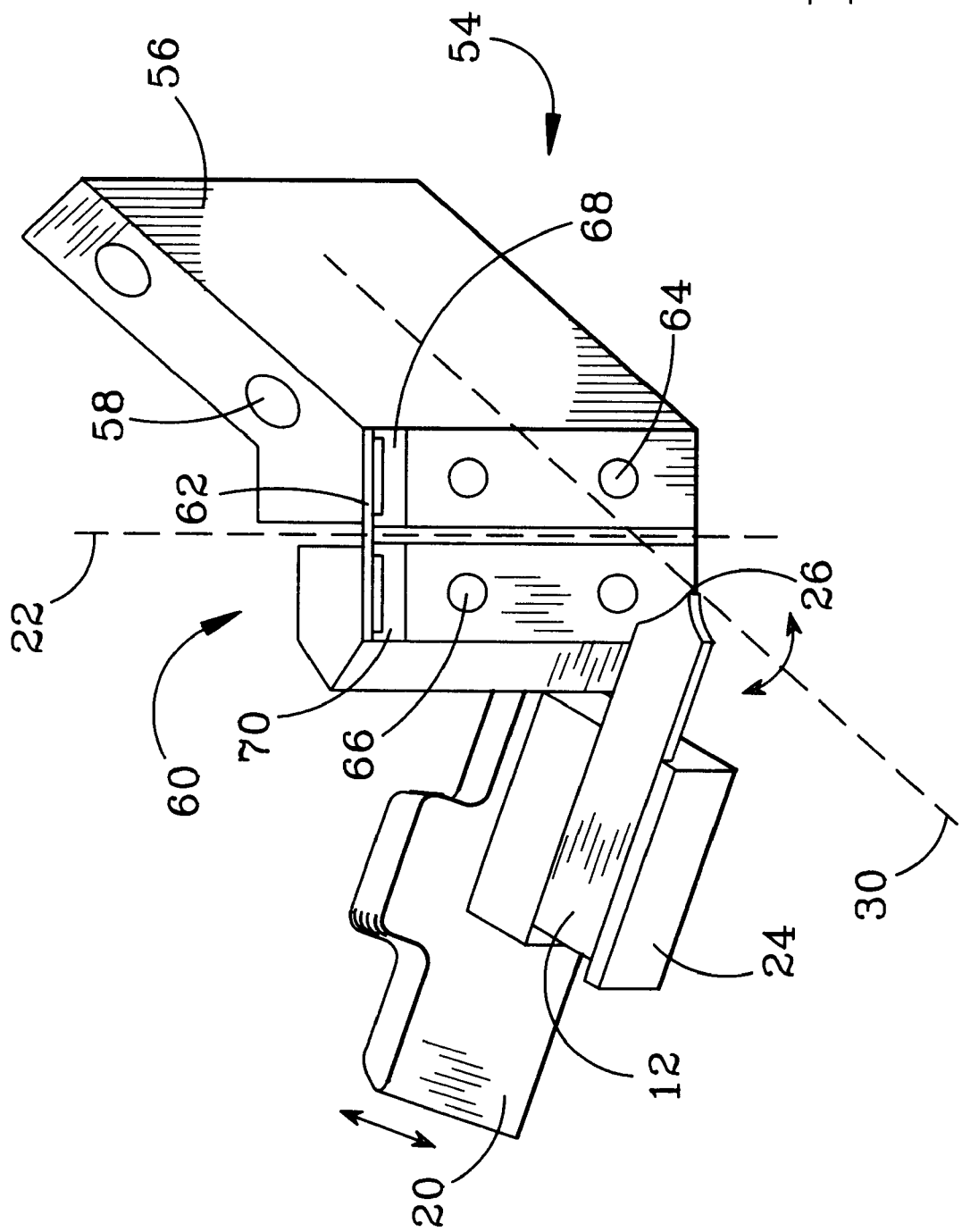
FIG. 3 is a perspective view of the single-point flexure mechanism shown in FIG. 2.

Pivot point 22 is defined by machining the ends of support 56 and lever arm 20 so that they are closely spaced, suitably 1mm apart, at approximately a 45 degree angle to form a beveled corner 60. A thin piece of metal 62 is placed on the outside of beveled corner 60 and fixed to both stationary support 56 and lever arm 20 as shown in detail in FIG. 3. Screws 64 and 66 clamp members 68 and 70 against metal 62 opposite the support structure 56 and lever arm 20, respectively. This defines the pivot point 22 in the piece of metal 62 at the corner of support structure 56, lever arm 20, clamp member 68 and clamp member 70 that functions as a hinge allowing lever arm 22 to rock back-and-forth slightly in the XZ plane while remaining extremely rigid along the Y-axis.

Tool arm 24 is attached to lever arm 20 and extends in the X direction, suspended above x-axis slide 46, where it holds cutting tool 12 perpendicular to lens blank 10 with the tip 26 lying on the axis 30 through pivot point 22 and parallel to the lens blank 10. A low force, large stroke range actuator 72 applies force to the unpinned end of lever arm 22 causing it to move back-and forth in the X direction so that tool arm 24 rocks around the pivot point causing the tip 26 of the cutting tool to oscillate back-and-forth through a very shallow arc 28 approximately perpendicular to the lens blank. An encoder read head 74 measures the position of the unpinned end of lever arm 22 and passes the data to a servo controller 76 that controls actuator 72.

As shown, actuator 72 is suitably a voice coil that includes a closed coil 78 that is mounted near the unpinned end of lever arm 20 and a permanent magnet 80 that is mounted on x-axis slide 46 adjacent the unpinned end of lever arm 20 and extends inside closed coil 78. Servo controller 76 drives current through the coil to produce a magnetic force that rocks the lever arm back-and-forth. The voice coil provides relatively little force or resistance to the motion of the lens blank. Therefore, the lengths of the lever and tool arms are ratioed to amplify the force while sacrificing stroke range. Other types of low force, large stroke range actuators such as leads screws and servo motors can be used in place of the voice coil.

In the example shown, the lever arm is approximately 2.5 times longer than the tool arm producing a force amplification of 2.5 times. Furthermore, because the voice coil has such a large stroke range, the stroke range of the tip is approximately 2.5 times the stroke range achieved with known amplified piezoelectric actuators. The increased stroke range greatly increases the variety of toric contact lens prescriptions that can be generated. In addition, the deamplification of the stroke range reduces the amount of back-and-forth motion at the tip thereby improving surface quality.

While several illustrative embodiments of the invention have been shown and described, numerous variations and alternate embodiments will occur to those skilled in the art. For example, the single-point flexure mechanism may be constructed in many different ways. Such variations and alternate embodiments are contemplated, and can be made without departing from the spirit and scope of the invention as defined in the appended claims.

We claim:

1. A contact lens forming machine, comprising:
   a spindle that holds a lens blank in an X-Y plane and rotates it around a spindle axis that is oriented along a Z-axis;
   a cutting tool that is held perpendicular to the lens blank;
   a slide mechanism that moves the spindle and cutting tool relative to each other in the X and Z directions to form a base curve on the lens blank;
   a single-point hinge on said slide mechanism which forms a pivot point, said hinge having a lever arm that is pinned at one end and is unpinned at the other end and a tool arm that extends from the lever arm to hold the cutting tool perpendicular to the rotating lens blank, said hinge bending in the X-Z plane and being rigid along its Y-axis; and an actuator that applies force to the unpinned end of the lever arm causing it to move back-and-forth through a stroke range, said motion being translated through said hinge to said tool arm so that the cutting tool oscillates back-and-forth through a shallow arc in the Z direction in synchronism with the lens blank rotation thereby superimposing a toric deviation on the base curve, said hinge's lever and tool arms being ratioed so that a) the force applied to the lever arm is amplified to the cutting tool to resist the force of the rotating lens pushing back on the tool and b) the stroke range of the lever arm is reduced to reduce any side-to-side motion of the cutting tool as it oscillates through the shallow arc.

2. The lens forming machine of claim 1, wherein the cutting tool is held so that it's tip lies on an axis through the pivot point and parallel to the lens blank to reduce any side-to-side motion of the cutting tool as it travels through the shallow arc.

3. The lens forming machine of claim 1, wherein the lever arm is longer than the tool arm to amplify the actuator's force and reduce its stroke range at the cutting tool.

4. The lens forming machine of claim 1, wherein said lever arm extends from said hinge in the Z direction and said tool arm extends from said lever arm in the X direction.

5. The lens forming machine of claim 1, wherein the actuator comprises a voice coil that applies the force to said lever arm.

6. The lens forming machine of claim 1, wherein said slide mechanism comprises:
   a Z-axis slide for moving said spindle in the Z direction; and
   an X-axis slide for moving said cutting tool in the X direction.

7. The lens forming machine of claim 1, wherein the pinned end of the lever arm is tapered, said single-point hinge comprising a flexible member that is clamped to the tapered end of the lever arm and a complementary tapered end of a support structure with an unclamped portion of the flexible member between the lever arm and the support structure forming a single pivot point.

8. A contact lens forming machine, comprising:
   a spindle that holds a contact lens blank in an X-Y plane and rotates it around a spindle axis that is oriented along a Z-axis;
   a single-point cutting tool having a cutting tip, said cutting tool held perpendicular to the contact lens blank;
   Z and X-axis slide mechanism that respectively move the spindle and cutting tool relative in the Z and X directions to form a base curve on the contact lens blank;
   a single-point hinge on said X-axis slide mechanism, said hinge having a lever arm that is pinned at a pivot point at one end, is unpinned at the other end and extends in the Z-direction, and a tool arm that extends from the lever arm in the X-direction to hold the cutting tool perpendicular to the contact lens blank so that said hinge bends in the X-Z plane and is rigid along its Y-axis, said tool arm being spaced from the pivot point so that the tip of the tool is approximately even with said pivot point; and
   a voice coil that applies force to the unpinned end of the lever arm causing the lever arm to move back-and-forth through a stroke range, said motion being translated through said hinge to said tool arm so that the cutting tool oscillates back-and-forth through a shallow arc in the Z direction in synchronism with the lens blank rotation thereby superimposing a toric deviation on the base curve, said hinge's lever and tool arms being ratioed so that a) the force applied to the lever arm is amplified to the cutting tool to resist the force of the rotating lens pushing back on the tool and b) the stroke range of the lever arm is reduced to reduce any side-to-side motion of the cutting tool as it oscillates through the shallow arc.

9. The lens forming machine of claim 8, wherein the pinned end of the lever arm is tapered, said single-point hinge comprising a flexible member that is clamped to the tapered end of the lever arm and a complementary tapered end of a support structure with an unclamped portion of the flexible member between the lever arm and the support structure forming a single pivot point that bends in the X-Z plane and is rigid along its Y-axis.

10. A method of forming a toric surface on a contact lens, comprising:
    rotating a lens blank in an X-Y plane around a spindle axis oriented along a Z-axis;
    pinning one end of a lever arm at a pivot point and leaving the other end unpinned so that the lever arm can bend in the X-Z plane and is rigid along its Y-axis;
    extending a tool arm from the lever arm to hold a single-point cutting tool perpendicularly against the rotating lens blank, said cutting tool having a cutting tip;
    moving said lens blank and cutting tool relative to each other in the X and Z directions to form a base curve on the lens blank;
    applying a force to the unpinned end of the lever arm causing it to move back-and-forth through a stroke range, said motion being translated through said hinge to said tool arm so that the cutting tool oscillates back-and-forth through a shallow arc in the Z direction in synchronism with the lens blank rotation thereby superimposing a toric deviation on the base curve; and
    ratioing said lever and tool arms so that a) the force applied to the lever arm is amplified to the cutting tool to resist the force of the rotating lens pushing back on the tool and b) the stroke range of the lever arm is reduced to reduce any side-to-side motion of the cutting tool as it oscillates through the shallow arc.

11. The method of claim 10, wherein said tool arm is spaced from the pivot point so that the tip of the tool is approximately even with said pivot point to reduce any side-to-side motion of the cutting tool as it travels through the shallow arc.

12. The method of claim 10, wherein said lever arm extends in the Z direction from the pivot point and the tool arm extends in the X direction from said lever arm.

13. A method of forming a toric surface on a contact lens, comprising:
    rotating a lens blank in an X-Y plane around a spindle axis oriented along a Z-axis;
    holding a single-point cutting tool perpendicularly against the rotating lens blank;
    moving said lens blank and cutting tool relative to each other in the X and Z directions to form a base curve on the lens blank;

providing an oscillatory motion with a force and stroke range; and translating the oscillatory motion to the cutting tool so that it oscillates back-and-forth through a shallow arc in the Z direction in synchronism with the lens blank rotation thereby superimposing a toric deviation on the base curve, said motion being translated so that a) the force is amplified to the cutting tool to resist the force of the rotating lens pushing back on the tool and b) the stroke range is reduced to reduce any side-to-side motion of the cutting tool as it oscillates through the shallow arc.

\* \* \* \* \*